US012570346B2

(12) United States Patent
    Iimura et al.

(10) Patent No.: US 12,570,346 B2
(45) Date of Patent: Mar. 10, 2026

(54) CART

(71) Applicant: Honda Motor Co., Ltd., Tokyo (JP)

(72) Inventors: Taiki Iimura, Saitama (JP); Kazumasa Ozaki, Saitama (JP); Hiroshi Iwakami, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 456 days.

(21) Appl. No.: 18/184,676

(22) Filed: Mar. 16, 2023

(65) Prior Publication Data

US 2023/0311966 A1      Oct. 5, 2023

(30)      Foreign Application Priority Data

Mar. 30, 2022      (JP) ................................. 2022-056985

(51) Int. Cl.
    *B62B 5/00*      (2006.01)
    *B60L 15/20*      (2006.01)
(52) U.S. Cl.
    CPC ............ *B62B 5/0036* (2013.01); *B60L 15/20* (2013.01); *B62B 5/0073* (2013.01); *B62B 5/0066* (2013.01)
(58) Field of Classification Search
    CPC ... B62B 5/0036; B62B 5/0073; B62B 5/0066; B60L 15/20
    USPC ......................................................... 180/6.5
    See application file for complete search history.

(56)      References Cited

U.S. PATENT DOCUMENTS

2015/0060175 A1      3/2015  Katayama
2015/0066278 A1      3/2015  Katayama

FOREIGN PATENT DOCUMENTS

| CN | 106167035 | | 11/2016 |
|---|---|---|---|
| EP | 3443945 | | 2/2019 |
| JP | H0422733 | | 1/1992 |
| JP | 2001097221 | | 4/2001 |
| JP | 2001097221 A | * | 4/2001 |
| JP | 2004114800 | | 4/2004 |
| JP | 2004114800 A | * | 4/2004 |
| JP | 2004120875 | | 4/2004 |
| JP | 2017035983 | | 2/2017 |

* cited by examiner

*Primary Examiner* — Valentin Neacsu
*Assistant Examiner* — Mohamed M Medani
(74) *Attorney, Agent, or Firm* — JCIPRNET

(57)      ABSTRACT

A cart includes: a body; wheels; a drive unit, driving each of the wheels; a handle, receiving a user's operation; an input detection sensor, detecting a load and/or moment applied to the handle; a rotation number sensor, detecting number of rotations of each of the wheels; and a control device, setting a target propulsive force to be output as a propulsive force from each of the wheels based on the load and/or moment, and controlling the drive unit to output the target propulsive force as the propulsive force. If the number of rotations of the wheel located on a side close to a turning center exceeds a predetermined threshold during turning, the control device sets the target propulsive force of the wheel located on a side away from the turning center to be less than the target propulsive force set based on the load and/or moment.

13 Claims, 9 Drawing Sheets

(A)

(B)

1
CART

CROSS-REFERENCE TO RELATED
APPLICATIONS

This application claims the priority benefit of Japan Application No. 2022-056985, filed on Mar. 30, 2022. The entirety of the above-mentioned patent application is hereby incorporated by reference herein and made a part of this specification.

BACKGROUND

Technical Field

The disclosure relates to a cart.

Related Art

Patent Document 1 discloses a power assist cart including a handle that detects a user's operating force, and a power assist control means that drives a drive wheel for traveling and steering based on the operating force input to the handle. [Patent Document 1] Japanese Patent Laid-open No. 2004-114800

In the cart as disclosed in Patent Document 1, when a front-rear velocity becomes excessively high during turning, a centrifugal force applied to the drive wheel is increased. Accordingly, when a frictional force applied to a wheel located on a side away from a turning center becomes greater than a maximum static frictional force, the wheel slips. Accordingly, a spin may occur in which the cart begins to rotate about a vertical axis passing through the center of gravity.

SUMMARY

One aspect of the disclosure provides a cart including: a body; a plurality of wheels, provided on the body; a drive unit, driving each of the wheels; a handle, provided on the body and receiving a user's operation; an input detection sensor, detecting a load and/or a moment applied to the handle; a rotation number sensor, detecting number of rotations of each of the wheels; and a control device, setting a target propulsive force to be output as a propulsive force from each of the wheels based on the load and/or the moment, and controlling the drive unit to output the target propulsive force as the propulsive force. If the number of rotations of the wheel located on a side close to a turning center exceeds a predetermined threshold during turning, the control device sets at least the target propulsive force of the wheel located on a side away from the turning center to be less than the target propulsive force set based on the load and/or the moment.

Another aspect of the disclosure provides a cart including: a body; a plurality of wheels, provided on the body; a drive unit, driving each of the wheels; a handle, provided on the body and receiving a user's operation; an input detection sensor, detecting a load and/or a moment applied to the handle; a rotation number sensor, detecting number of rotations of each of the wheels; and a control device, setting a target velocity and a target angular velocity of the cart based on the load and/or the moment, acquiring a drive amount of each of the wheels and controlling the drive unit to cause the cart to travel at the target velocity and the target angular velocity. If the number of rotations of the wheel located on a side close to a turning center exceeds a predetermined threshold during turning, the control device acquires at least the drive amount of the wheel located on a side away from the turning center based on a corrected target velocity less than the target velocity set based on the load and/or the moment and the target angular velocity.

DESCRIPTION OF THE EMBODIMENTS

Figure 1:
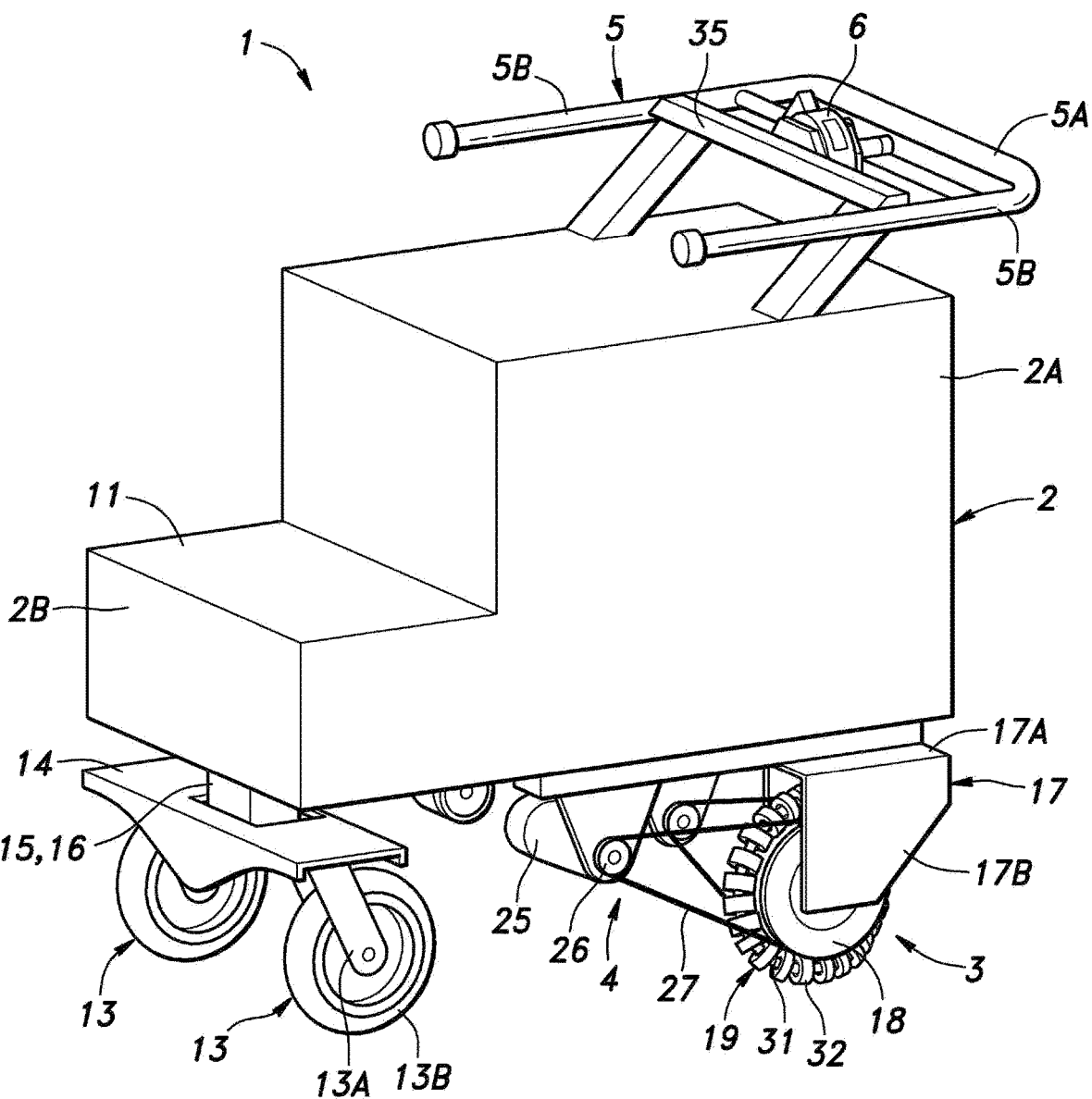
FIG. 1 is a perspective view of a cart according to the disclosure.

The disclosure provides a cart that is able to perform a proper turning motion while being prevented from spinning.
An aspect of the disclosure provides a cart (1) including: a body (2); a plurality of wheels (3), provided on the body; a drive unit (4), driving each of the wheels; a handle (5), provided on the body and receiving a user's operation; an input detection sensor (6), detecting a load and/or a moment applied to the handle; a rotation number sensor (7), detecting number of rotations of each of the wheels; and a control device (8), setting a target propulsive force to be output as a propulsive force from each of the wheels based on the load and/or the moment, and controlling the drive unit to output the target propulsive force as the propulsive force. If the number of rotations of the wheel located on a side close to a turning center exceeds a predetermined threshold during turning, the control device sets at least the target propulsive force of the wheel located on a side away from the turning center to be less than the target propulsive force set based on the load and/or the moment.

According to this aspect, the propulsive force of the wheel located on the side away from the turning center during turning is set less than the target propulsive force set based on input of the load and/or moment. Accordingly, since the cart is decelerated, the cart can be prevented from spinning, and the cart can be provided that is able to perform a proper turning motion.

In the above aspect, preferably, the control device sets the target propulsive force of the wheel located on the side away from the turning center to gradually decrease with time.

According to this aspect, the cart can be prevented from spinning, and a sudden decline in the propulsive force of the wheel can be prevented.

In the above aspect, preferably, the control device updates the target propulsive force of the wheel located on the side away from the turning center by multiplication by a predetermined numerical value less than 1 at intervals of a predetermined time, and causes the target propulsive force to gradually decrease with time.

According to this aspect, the propulsive force of the wheel can be gradually decreased by a simple method.

In the above aspect, preferably, the threshold in the case where the wheels are lined up in a direction orthogonal to a turning direction with respect to the body is greater than the threshold in the case where the wheels are lined up parallel to the turning direction with respect to the body.

When the wheels are lined up parallel to the turning direction, changing a turning radius by changing a propulsive force is not easy as compared to the case where the wheels are lined up in the direction orthogonal to the turning direction. According to this aspect, when lined up parallel to the turning direction with respect to the body and it is not easy to change the turning radius, a threshold is set less than that of the case of being lined up orthogonal to the turning direction. Thus, when it is difficult to change the turning radius, a prompt change of the propulsive force is enabled.

In the above aspect, preferably, the control device sets the target propulsive force of the wheel located on the side away from the turning center based on the load and/or the moment obtained by multiplying the load and/or the moment acquired by the input detection sensor by a predetermined first parameter less than 1.

According to this aspect, since the propulsive force of the wheel located on the side away from the turning center during turning is set less than the target propulsive force set based on input of the load and/or moment, the cart can be prevented from spinning.

In the above aspect, preferably, the control device sets the target propulsive force of the wheel located on the side close to the turning center based on the load and/or the moment obtained by multiplying the load and/or the moment acquired by the input detection sensor by a predetermined second parameter less than 1. The first parameter and the second parameter are set to different values.

According to this aspect, since the propulsive force of the cart is set lower than the propulsive force set based on the load and/or moment acquired by the input detection sensor, the cart can be prevented from spinning.

In the above aspect, preferably, the first parameter is less than the second parameter.

According to this aspect, since the propulsive force of the wheel located on the side away from the turning center is set relatively low, the cart can be effectively prevented from spinning.

In the above aspect, preferably, the wheel is an omnidirectional wheel that is able to be driven in each of a front-rear direction and a left-right direction. The control device controls the drive unit to output the target propulsive force as the propulsive force in the front-rear direction, and sets the propulsive force in the left-right direction of the wheel located on the side close to the turning center in the same direction as a centrifugal force.

According to this aspect, since the cart is pushed in a direction away from the turning center and the turning radius is increased, the cart can be prevented from spinning.

In the above aspect, preferably, the control device acquires a target velocity and a target angular velocity of the cart based on the load and/or the moment, sets the target propulsive force corresponding to the target velocity and the target angular velocity, and controls the drive unit to output the target propulsive force as the propulsive force. If the number of rotations of the wheel located on the side close to the turning center exceeds the threshold during turning, the control device sets the target velocity to be less than the target velocity set based on the load and/or the moment.

According to this aspect, the target velocity of the wheel located on the side away from the turning center during turning is set less than the target velocity set based on input of the load and/or moment. Accordingly, since the cart is decelerated, the cart can be prevented from spinning, and the cart can be provided that is able to perform a proper turning motion.

An aspect of the disclosure provides a cart (1) including: a body (2); a plurality of wheels (3), provided on the body; a drive unit (4), driving each of the wheels; a handle (5), provided on the body and receiving a user's operation; an input detection sensor (6), detecting a load and/or a moment applied to the handle; a rotation number sensor (7), detecting number of rotations of each of the wheels; and a control device (8), setting a target velocity and a target angular velocity of the cart based on the load and/or the moment, acquiring a drive amount of each of the wheels and controlling the drive unit to cause the cart to travel at the target velocity and the target angular velocity. If the number of rotations of the wheel located on a side close to a turning center exceeds a predetermined threshold during turning, the control device acquires at least the drive amount of the wheel located on a side away from the turning center based on a corrected target velocity less than the target velocity set based on the load and/or the moment and the target angular velocity.

According to this aspect, the target velocity of the wheel located on the side away from the turning center during turning is set less than the target velocity set based on input of the load and/or moment. Accordingly, since the cart is decelerated, the cart can be prevented from spinning, and the cart can be provided that is able to perform a proper turning motion.

According to the above configurations, a cart can be provided that is able to perform a proper turning motion while being prevented from spinning.

First Embodiment

Embodiments of a cart according to the disclosure will be described below with reference to the drawings. Hereinafter, each direction is defined with the cart as a reference.

As shown in FIG. 1, a cart 1 includes: a body 2; at least one omnidirectional wheel 3, provided on the body 2 and moving the body 2 in all directions along a floor surface; a drive unit 4, driving each omnidirectional wheel 3; a handle 5, provided on the body 2 and receiving a user's operation; a force sensor 6 (an example of an input detection sensor), detecting a load applied to the handle 5; a rotation number sensor 7, acquiring the number of rotations of the omnidirectional wheel 3; and a control device 8, controlling the drive unit 4 based on the load detected by each force sensor 6.

The body 2 extends in a front-rear direction. A rear part 2A of the body 2 extends above a front part 2B. The front part 2B of the body 2 is provided with a support stand 11 for supporting another device. Examples of the device supported by the support stand 11 include an inspection device such as an X-ray scanner. The device may be fastened to the support stand 11. The control device 8, a battery, and various sensors may be provided inside the rear part 2A of the body 2.

In the present embodiment, a pair of omnidirectional wheels 3 are provided at a lower portion of the rear part 2A of the body 2. Left and right casters 13 are supported by a lower portion of the front part 2B of the body 2 via a suspension. The suspension includes: an arm 14, arranged below the body 2 and extending in a left-right direction; and a spring 15 and a shock absorber 16, arranged between the body 2 and the arm 14. Each caster 13 is arranged below left and right ends of the arm 14. Each caster 13 includes: a fork 13A, rotatably coupled to the arm 14 about an axis extending in an up-down direction; and a wheel 13B, rotatably supported by the fork 13A about an axis extending in a horizontal direction. The fork 13A rotates freely with respect to the arm 14, and the wheel 13B rotates freely with respect to the fork 13A.

Figure 2:
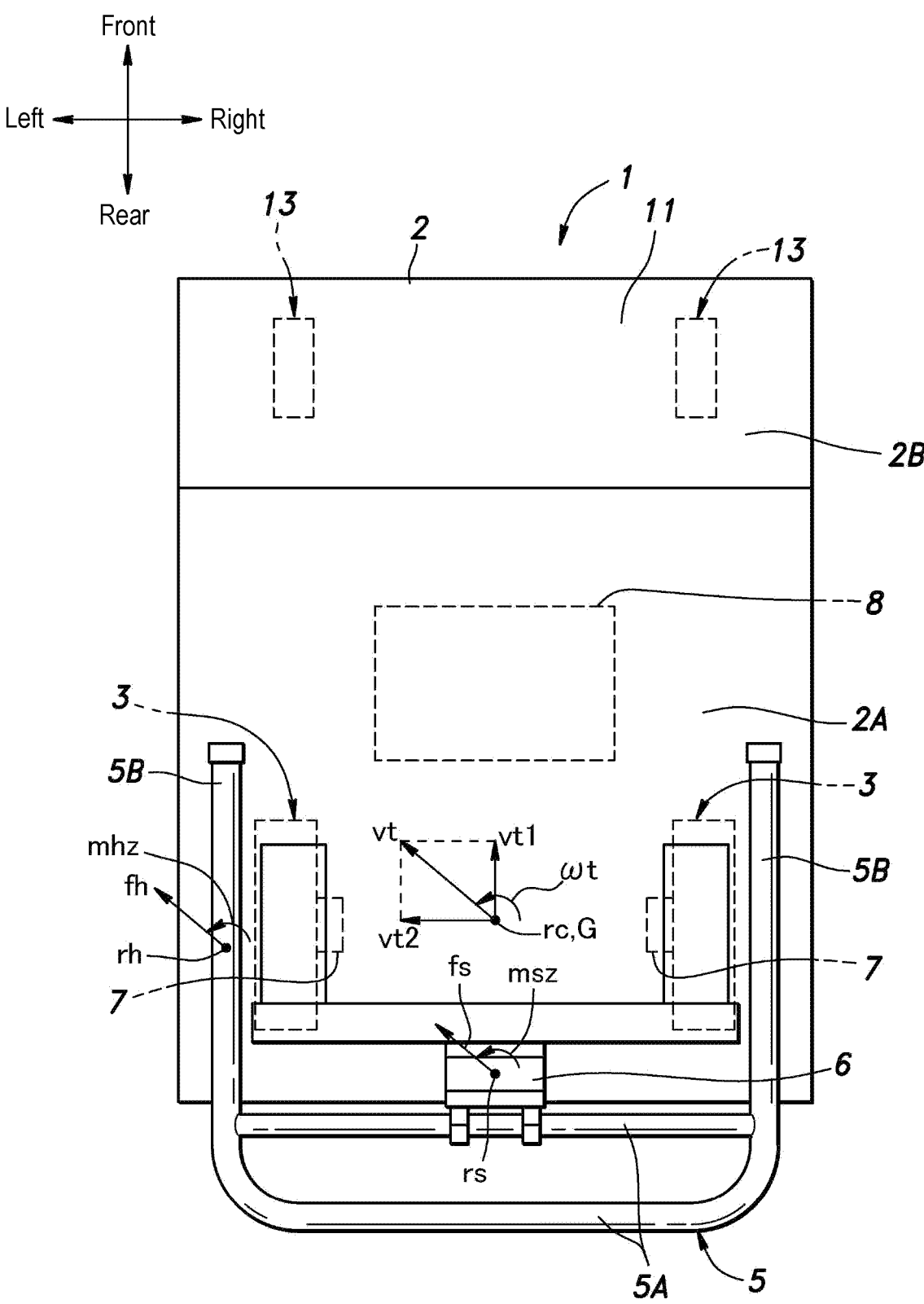
FIG. 2 is a plan view of a cart.
Figure 3:
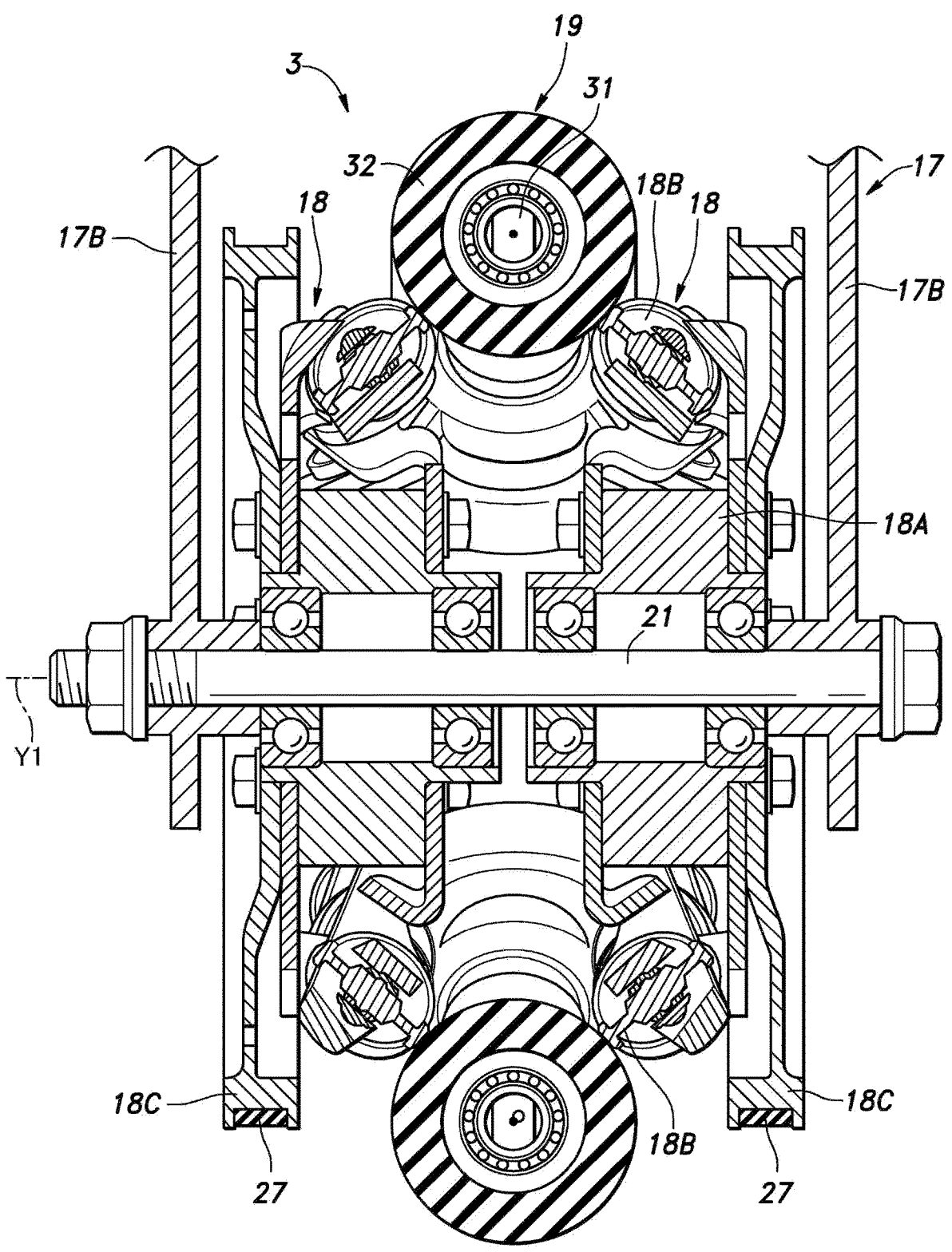
FIG. 3 is a sectional view of an omnidirectional wheel 3.

As shown in FIG. 2, the pair of omnidirectional wheels 3 are arranged with an interval therebetween in the left-right direction. In the present embodiment, the pair of omnidirectional wheels 3 are arranged at the lower left and lower right of the rear part 2A of the body 2. As shown in FIG. 3, each omnidirectional wheel 3 includes: a frame 17; a pair of drive discs 18, rotatably supported by the frame 17; and a main wheel 19 of an annular shape, arranged between the pair of drive discs 18.

As shown in FIG. 1 and FIG. 3, the frame 17 has: a frame top 17A, coupled to a lower part of the body 2; and a pair of frame sides 17B, extending downward from both left and right ends of the frame top 17A. A support shaft 21 extending in the left-right direction is extended across lower ends of the pair of frame sides 17B. The pair of drive discs 18 are rotatably supported by the support shaft 21. The pair of drive discs 18 rotate about an axis Y1 of the support shaft 21. A position of each drive disc 18 in the left-right direction with respect to the support shaft 21 is restricted. The drive discs 18 face each other with a distance therebetween in the left-right direction.

The drive disc 18 is arranged on each of both sides of the main wheel 19 of an annular shape, and applies a frictional force to the main wheel 19 to rotate the main wheel 19 about a central axis and about an annular axis. The drive disc 18 includes: a base 18A of a disc shape, rotatably supported by the frame 17; and a plurality of drive rollers 18B, rotatably supported to be inclined with respect to each other at an outer periphery of the base 18A and being in contact with the main wheel 19. The base 18A is arranged coaxially with the support shaft 21.

A driven pulley 18C is provided on each of opposite surfaces of each drive disc 18. The driven pulley 18C is provided coaxially with the drive disc 18. The drive unit 4 is provided at a lower part of the body 2 and includes a plurality of electric motors 25 corresponding to each drive disc 18. In the present embodiment, four electric motors 25 are provided corresponding to four drive discs 18. A drive pulley 26 is provided on an output shaft of each electric motor 25. The drive pulley 26 and the driven pulley 18C corresponding to each other are connected by a belt 27. By rotating each electric motor 25 independently of each other, each drive disc 18 rotates independently of each other.

Figure 4:
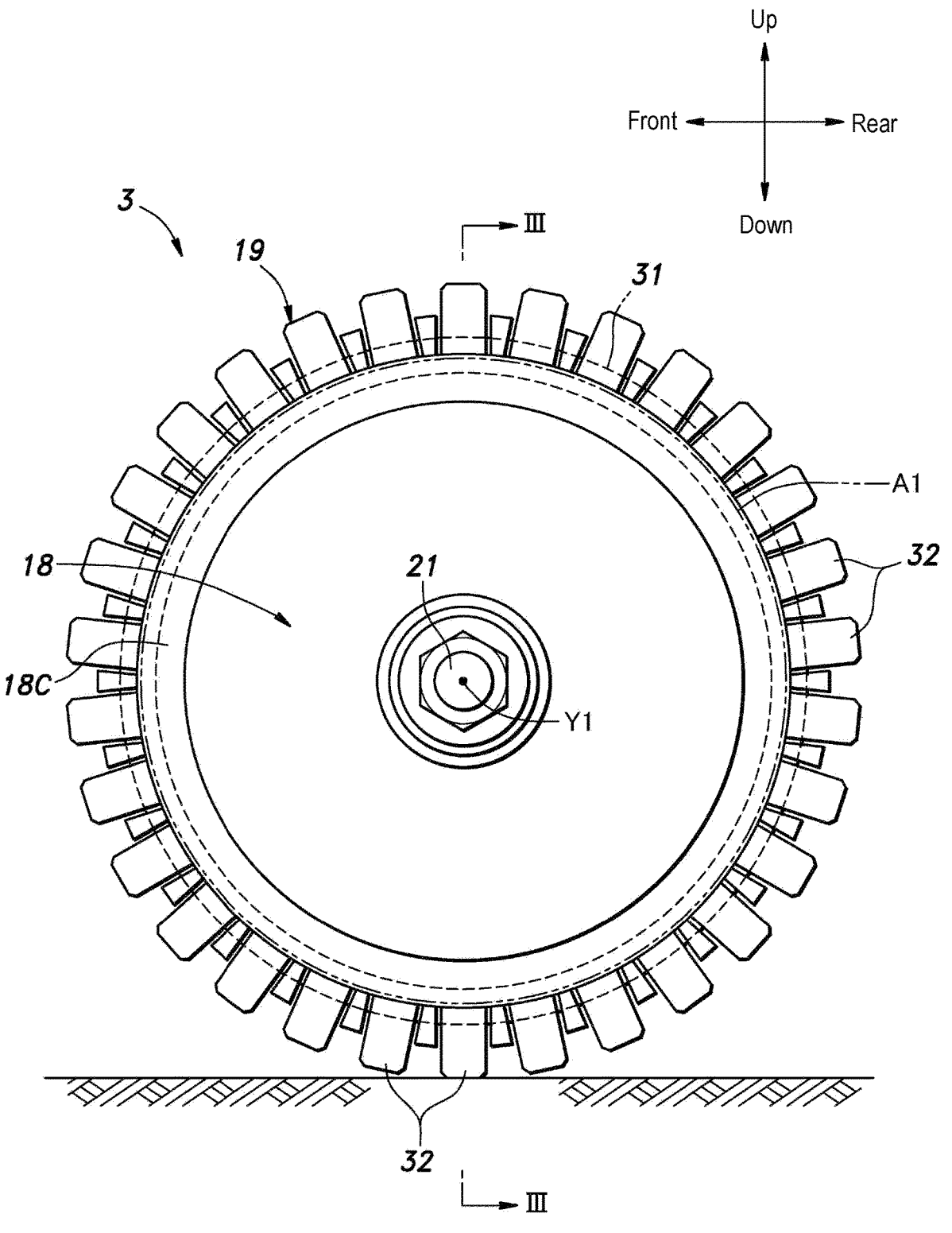
FIG. 4 is a side view of a main wheel.

As shown in FIG. 4, the main wheel 19 is of an annular shape, is arranged between and coaxially with the pair of drive discs 18, is in contact with the plurality of drive rollers 18B, and is rotatable about the central axis and about the annular axis. The main wheel 19 includes a core body 31 of an annular shape and a plurality of driven rollers 32 rotatably supported by the core body 31. The plurality of driven rollers 32 are arranged at equal intervals in a circumferential direction of the core body 31. Each driven roller 32 is supported by the core body 31 so as to be rotatable about an axis A1 (annular axis) of the core body 31 of an annular shape. Each driven roller 32 is able to rotate at each position with respect to the core body 31 about a tangent of the core body 31. Each driven roller 32 rotates with respect to the core body 31 upon receiving an external force.

The main wheel 19 is arranged along an outer periphery of the pair of drive discs 18 and is in contact with the plurality of drive rollers 18B provided on each drive disc 18. The drive roller 18B of each drive disc 18 is in contact with an inner periphery of the main wheel 19 and clamps the main wheel 19 from both left and right sides. By contact with the inner periphery of the main wheel 19, displacement of the drive roller 18B of the left and right drive discs 18 in a radial direction about the axis Y1 of the drive disc 18 is restricted. Accordingly, the main wheel 19 is supported by the left and right drive discs 18, and the central axis of the main wheel 19 (core body 31) is arranged coaxially with the axis Y1 of the left and right drive discs 18. The main wheel 19 is in contact with the plurality of drive rollers 18B of the left and right drive discs 18 at the plurality of driven rollers 32.

In each omnidirectional wheel 3, if the pair of drive discs 18 rotate in the same direction at the same rotation speed, the main wheel 19 rotates together with the pair of drive discs 18. That is, the main wheel 19 rotates forward or rearward about its own rotation axis that coincides with the axis Y1. At this time, the drive roller 18B of the drive disc 18 and the driven roller 32 of the main wheel 19 do not rotate with respect to the core body 31. In each omnidirectional wheel 3, if a rotation speed difference occurs between the pair of drive discs 18, with respect to a force in the circumferential (tangential) direction due to rotation of the pair of drive discs 18, a force component in a direction orthogonal to this force acts on the driven roller 32 of the main wheel 19 from the left and right drive rollers 18B. Since an axis of the drive roller 18B is inclined with respect to the circumferential direction of the drive roller 18B, the force component is generated between the drive discs 18 due to the rotation speed difference. By this force component, the drive roller 18B is rotated with respect to the base 18A and the driven roller 32 is rotated with respect to the core body 31. Accordingly, the main wheel 19 generates a propulsive force in the left-right direction.

By rotation of the left and right omnidirectional wheels 3 forward at the same speed, the cart 1 moves forward. By rotation of the left and right omnidirectional wheels 3 rearward at the same speed, the cart 1 moves backward. By the occurrence of a speed difference in rotation of the left and right omnidirectional wheels 3 in the front-rear direction, the cart 1 turns to the right or to the left. By rotation of the driven roller 32 of each main wheel 19 of the left and right omnidirectional wheels 3, the cart 1 translates to the right or to the left.

As shown in FIG. 1 and FIG. 2, at an upper portion of the rear part 2A of the body 2, a handle holder 35 is provided protruding upward. The handle 5 is supported by the handle holder 35 via the force sensor 6. The force sensor 6 may be a three-axis force sensor that detects load along two axes orthogonal to each other on a horizontal plane and moment about a vertical axis (z-axis). In the present embodiment, the force sensor 6 detects front-rear load being load applied to the handle 5 in the front-rear direction (x-axis), left-right load being load in the left-right direction (y-axis), and the moment about the vertical axis (z-axis). The force sensor 6 includes a main body and an input part provided on the main body. The main body is coupled to the handle holder 35.

The handle 5 includes: a horizontal part 5A, extending in the left-right direction; and a pair of vertical parts 5B, extending forward from both left and right ends of the horizontal part 5A. A central portion of the horizontal part 5A in the left-right direction is coupled to the input part of the force sensor 6.

As shown in FIG. 2, when the user applies an external force fh and a moment mhz at a position rh in the handle 5, the force sensor 6 detects a detected force fs and a detected moment msz at a sensor position rs. The detected force fs includes a front-rear load fs1 being a front-rear component and a left-right load fs2 being a left-right component.

The rotation number sensor 7 is provided for each omnidirectional wheel 3 and supported by the body 2. The rotation number sensor 7 detects the number of rotations (number of times the omnidirectional wheel 3 rotates about the axis Y1 per unit time; also referred to as rotation speed) of the corresponding omnidirectional wheel 3 about the axis Y1. However, the disclosure is not limited to this aspect, and the rotation number sensor may detect each of the number of rotations of the core body 31 of the omnidirectional wheel 3 about the axis Y1 and the number of rotations of the driven roller 32 about the axis A1.

The control device 8 is an electronic control unit (ECU) including a processor such as a CPU and a memory such as a non-volatile memory (ROM) and a volatile memory (RAM). The control device 8 controls the drive unit 4 by executing arithmetic processing in the processor in accordance with a program stored in the non-volatile memory. The control device 8 may be configured as one piece of hardware, or may be configured as a unit composed of a plurality of pieces of hardware. At least a portion of each functional part of the control device 8 may be realized by hardware such as large scale integration (LSI), an application specific integrated circuit (ASIC) or a field programmable gate array (FPGA), or may be realized by a combination of software and hardware.

Figure 5:
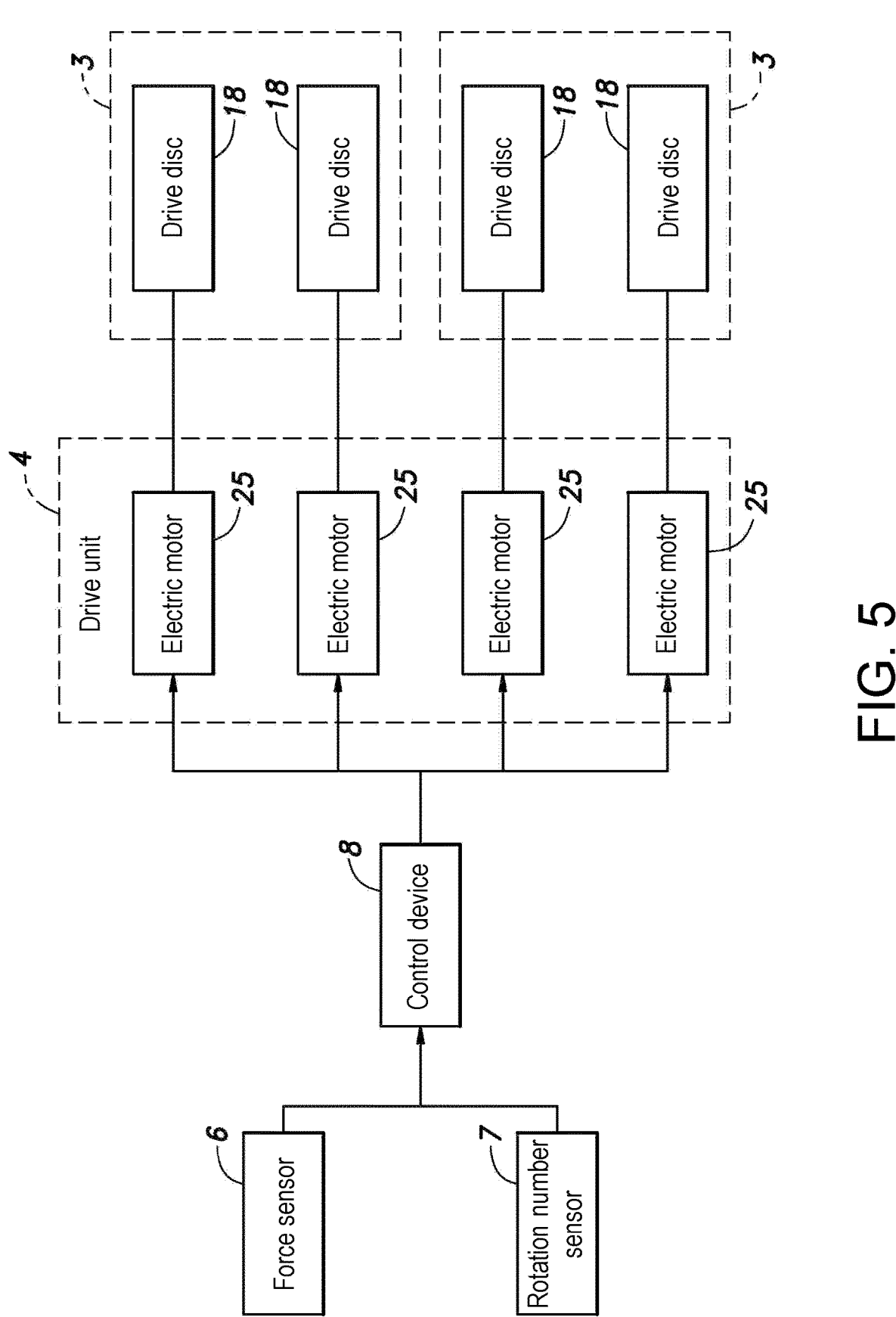
FIG. 5 is a block view showing a control device of a cart.

As shown in FIG. 5, the control device 8 is connected with the force sensor 6, the rotation number sensor 7, and the drive unit 4. The force sensor 6 and the rotation number sensor 7 output a detection signal (detection result) to the control device 8. The control device 8 outputs a control signal based on a signal from the force sensor 6 and the rotation number sensor 7, and controls the drive unit 4.

The force sensor 6 is interposed between the body 2 and the handle 5. The force sensor 6 detects the magnitude and direction of an operating force (load) applied by the user to the handle 5. The control device 8 may determine a target front-rear velocity vt1, a target left-right velocity vt2 and a target angular velocity wt of the cart 1 based on a signal from the force sensor 6, and may determine a control amount of each electric motor 25 of the drive unit 4 based on the target front-rear velocity vt1, the target left-right velocity vt2 and the target angular velocity wt. The control device 8 may determine the control amount of each electric motor 25 based on a target propulsive force set for each omnidirectional wheel 3.

A predetermined counter is stored in the memory of the control device 8. The counter is set to 0 when the cart 1 is started. Hereinafter, a numerical value of the counter is referred to as n.

Figure 6:
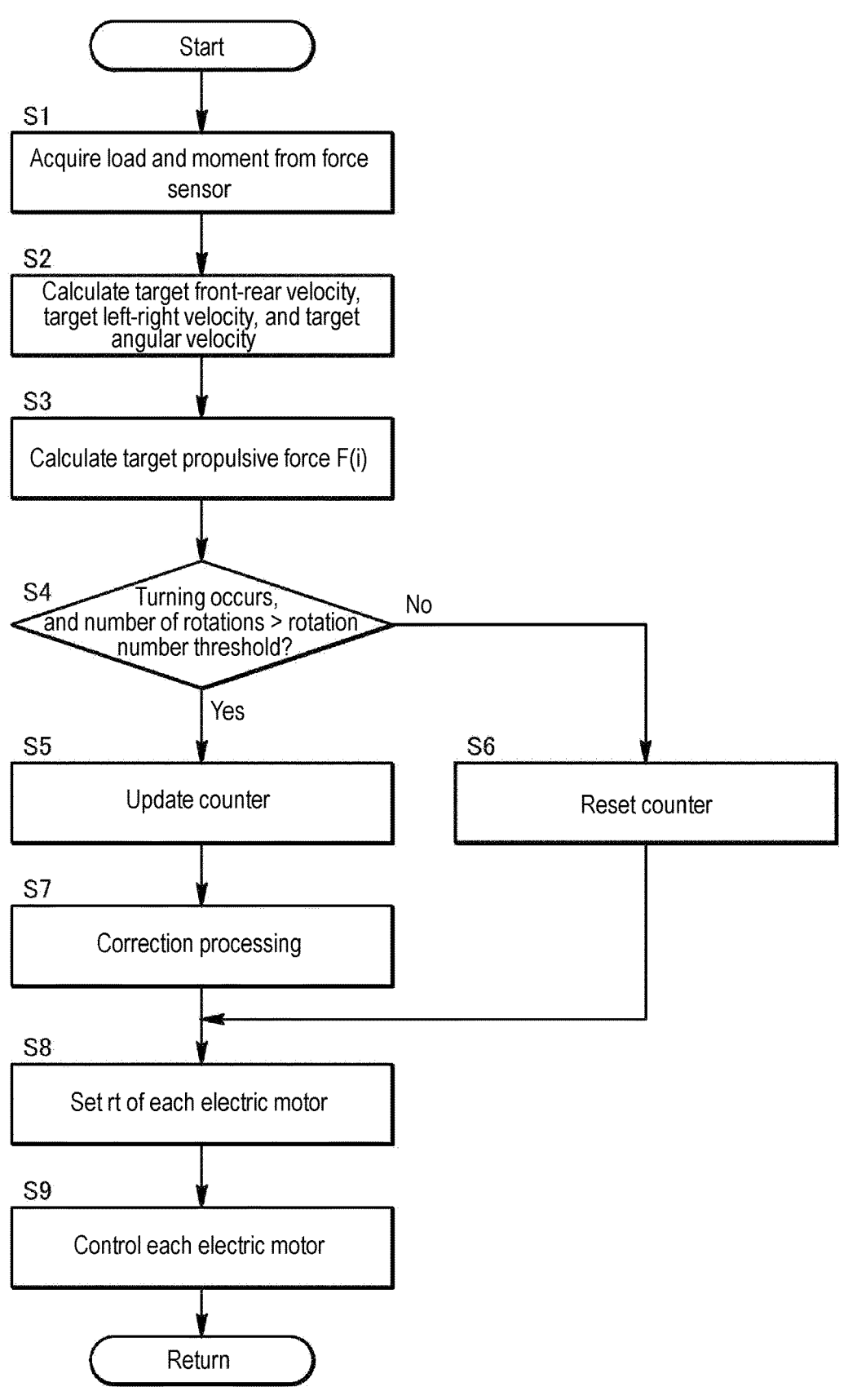
FIG. 6 is a flowchart showing drive processing executed by a control device according to a first embodiment.

The control device 8 performs drive processing shown in a flowchart of FIG. 6 at intervals of a predetermined time during starting of the cart 1, and controls the drive unit 4. Details of the drive processing are described below with reference to FIG. 6.

In the first step S1 of the drive processing, based on a signal from the force sensor 6, the control device 8 acquires the detected force fs and the detected moment msz detected by the force sensor 6. The detected force fs includes the front-rear load fs1 and the left-right load fs2.

When step S1 is completed, the control device 8 executes step S2. In step S2, the control device 8 sets the target front-rear velocity vt1 of the body 2 based on the front-rear load fs1, sets the target left-right velocity vt2 of the body 2 based on the left-right load fs2, and sets the target angular velocity wt about a vertical axis of the body 2 based on the moment msz about a vertical axis. Hereinafter, a velocity vector composed of the target front-rear velocity vt1 and the target left-right velocity vt2 is referred to as target velocity vt, if necessary.

When the front-rear load fs1 is forward, the control device 8 sets the target front-rear velocity vt1 to be forward. In the present embodiment, if the target front-rear velocity vt1 is forward, that is, the cart 1 moves forward, the target front-rear velocity vt1 is set to be positive. That is, if the target front-rear velocity vt1 is rearward, that is, the cart 1 moves backward, the target front-rear velocity vt1 is set to be negative.

The target front-rear velocity vt1 may be set, for example, by multiplying the front-rear load fs1 by a predetermined coefficient k1. The target left-right velocity vt2 may be set, for example, by multiplying the left-right load fs2 by a predetermined coefficient k2. The target angular velocity wt may be set, for example, by multiplying the moment msz about the vertical axis by a predetermined coefficient k3. The target angular velocity wt is set about a reference point rc. The reference point rc may be set at a position that coincides with the center of gravity G of the cart 1 in plan view. In the present embodiment, the reference point rc is arranged at a midpoint of a line segment connecting the pair of omnidirectional wheels 3. A method for setting the target front-rear velocity vt1, the target left-right velocity vt2, and the target angular velocity wt is not limited to the above.

The left-right load fs2 applied by an operator that moves the cart 1 may be sufficiently less than the front-rear load fs1, or alternatively, the coefficient k2 may be sufficiently less than the coefficients k1 and k3.

When setting of the target front-rear velocity vt1, the target left-right velocity vt2, and the target angular velocity wt is completed, the control device 8 executes step S3. In step S3, in order to output each of the target front-rear velocity vt1, the target left-right velocity vt2 and the target angular velocity wt, the control device 8 calculates a target propulsive force F(i) to be output by each of the left and right omnidirectional wheels 3. Here, i means an argument (index) determined for each omnidirectional wheel 3. For example, i may be determined to be 1 for the omnidirectional wheel 3 on the left side and 2 for the omnidirectional wheel 3 on the right side.

The target propulsive force F(i) may include a target number of rotations of the omnidirectional wheel 3 (core body 31) about the axis Y1. The target propulsive force F(i) may further include a target number of rotations of the driven roller 32 about the axis A1. When there is a difference in the target number of rotations about the axis Y1 between the left and right omnidirectional wheels 3, the cart 1 turns.

Next, when calculation of the target propulsive force F(i) is completed, the control device 8 executes step S4. In step S4, the control device 8 acquires a turning direction of the cart 1 based on the target propulsive force F(i). The control device 8 may acquire the turning direction based on a difference in the target number of rotations about the axis Y1 between the left and right omnidirectional wheels 3. When the difference in the target number of rotations about the axis Y1 between the left and right omnidirectional wheels 3 is zero or equal to or less than a predetermined value, it may be determined that the cart 1 is moving straight forward (with no turning direction).

Next, the control device 8 acquires from the rotation number sensor 7 the detected number of rotations of the left and right omnidirectional wheels 3 about the axis Y1. After that, regarding the omnidirectional wheel 3 that has a turning direction (that is, is turning) and is located on a side close to a turning center, the control device 8 determines whether the number of rotations about the axis Y1 detected by the rotation number sensor 7 has exceeded a predetermined rotation number threshold. The control device 8 may determine whether turning occurs based on the difference in the target number of rotations about the axis Y1 between the left and right omnidirectional wheels 3.

When the cart 1 turns and the number of rotations about the axis Y1 detected in the omnidirectional wheel 3 located on the side close to the turning center has exceeded the rotation number threshold, the control device 8 executes step S5, otherwise step S6.

In step S5, the control device 8 updates the numerical value of the counter to n+1, thereby adding 1 to the counter and updating the counter. When update of the counter is completed, the control device 8 executes step S7.

In step S7, the control device 8 executes correction processing. The correction processing is processing for correcting so as to reduce the target propulsive force F(i) set in step S3 for the omnidirectional wheel 3 located on a side away from the turning center.

In the present embodiment, the control device 8 first identifies an index $i_0$ corresponding to the omnidirectional wheel 3 located on the side away from the turning center based on the turning direction acquired in step S4. After that, by updating a target propulsive force $F(i_0)$ for the omnidirectional wheel 3 located on the side away from the turning center to a value $(\alpha'' \times F(i_0))$ obtained by multiplying the target propulsive force $F(i_0)$ obtained in step S3 by a value $(\alpha''$; power of $\alpha)$ obtained by raising a predetermined numerical value (hereinafter deceleration coefficient $\alpha$) less than 1 to the power of n, the control device 8 corrects the target propulsive force $F(i_0)$. However, at this time, the control device 8 may correct the target propulsive force $F(i_0)$ by updating it to a value $(\alpha \times F(i_0))$ obtained by multiplication by the deceleration coefficient $\alpha$. When the correction is completed, the control device 8 executes step S8.

In step S6, the control device 8 substitutes 0 for n, thereby changing the counter to 0 and resetting the counter. When reset of the counter is completed, the control device 8 executes step S8.

In step S8, the control device 8 sets a target rotation speed rt of each electric motor 25 based on the target propulsive force F(i) set for each omnidirectional wheel 3. After that, in step S9, the control device 8 controls a current supplied to each electric motor 25 so that the number of revolutions of each electric motor 25 becomes a target number of revolutions, and controls each electric motor 25.

Next, effects of the cart 1 configured in this way are described.

Figure 7:
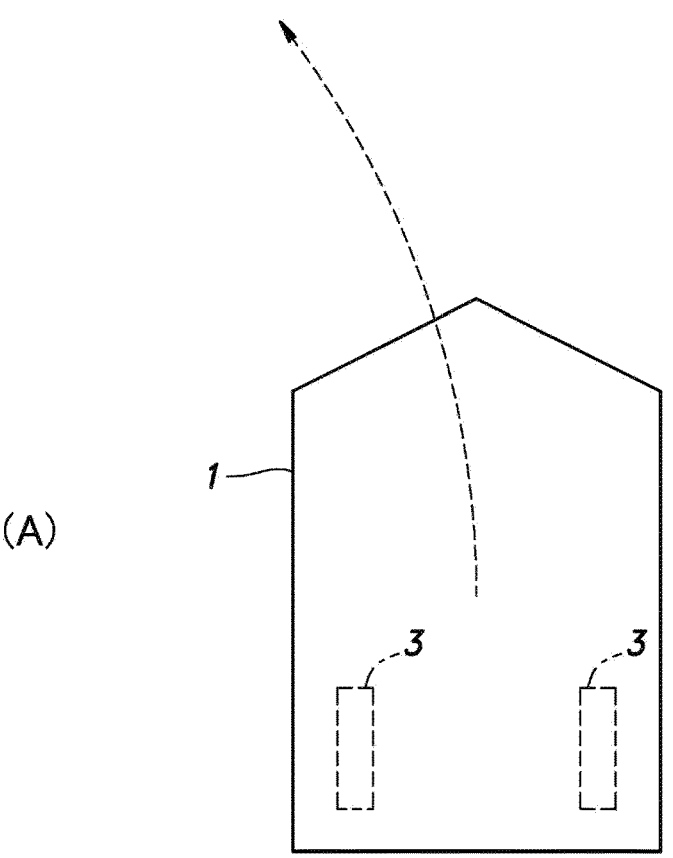
FIG. 7 includes a plan view (A) and a rear view (B) for describing a state of a cart during turning.
Figure 7:
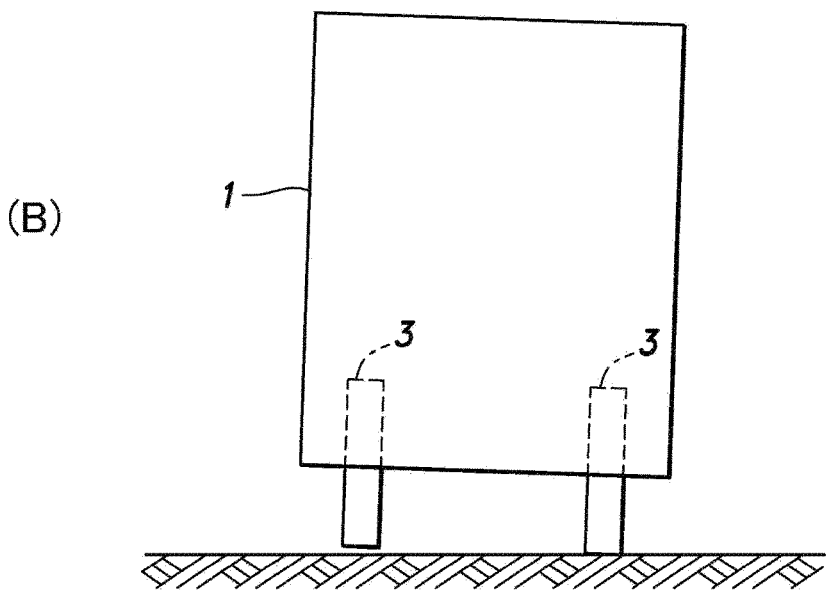

As shown in (A) of FIG. 7, when the cart 1 turns, it is conceivable that the body 2 may tilt outward in the turning direction due to the centrifugal force, as shown in (B) of FIG. 7. At this time, the omnidirectional wheel 3 located close to the turning center may float from the floor surface, and a frictional force between the omnidirectional wheel 3 and the floor surface may decrease. The present inventor has found that, due to this decrease in frictional force, the omnidirectional wheel 3 located on the side close to the turning center slips or idles, thereby increasing the number of rotations of the omnidirectional wheel 3 located on the side close to the turning center.

When the omnidirectional wheel 3 located on the side close to the turning center slips or idles, since the cart 1 is mainly driven by the omnidirectional wheel 3 located on the side away from the turning center, a turning radius is decreased and the centrifugal force acts relatively strongly. Hence, it is conceivable that the cart 1 may spin as a result.

If the cart 1 turns and the number of rotations of the omnidirectional wheel 3 located on the side close to the turning center has exceeded the rotation number threshold (Yes in S4), the target propulsive force $F(i_0)$ of the omnidirectional wheel 3 located on the side away from the turning center during turning is corrected (S7) to be less than the target propulsive force $F(i_0)$ set based on input of the load and/or moment in step S3.

By this correction, the propulsive force of the omnidirectional wheel 3 located on the side away from the turning center is suppressed, the cart 1 decelerates, and the turning radius of the cart 1 is increased. Thus, the cart 1 can be prevented from spinning, and the cart 1 can be provided that is able to perform a proper turning motion.

When the number of rotations of the omnidirectional wheel 3 located on the side close to the turning center has exceeded the rotation number threshold (Yes in S4), the correction processing is performed. Thus, compared to the case based on the number of rotations of the omnidirectional wheel 3 located on the side away from the turning center, since it can be promptly detected that the cart 1 is transitioning to a spinning state, the cart 1 can be effectively prevented from spinning.

After the number of rotations of the omnidirectional wheel 3 located on the side close to the turning center has exceeded the rotation number threshold, each time the drive processing is performed while this state is maintained, the counter is updated. Hence, each time the drive processing is performed, the target propulsive force $F(i_0)$ is multiplied by the deceleration coefficient $\alpha$. Thus, during a period during which the number of rotations of the omnidirectional wheel 3 located on the side close to the turning center exceeds the rotation number threshold, the target propulsive force $F(i_0)$ output from the omnidirectional wheel 3 located on the side away from the turning center gradually decreases with time.

Thus, during the period during which the number of rotations of the omnidirectional wheel 3 located on the side close to the turning center exceeds the rotation number threshold, the counter increases, and the propulsive force output from the omnidirectional wheel 3 located on the side away from the turning center gradually decreases with time. Thus, a sudden decline in the propulsive force output from the omnidirectional wheel 3 can be prevented. Since the target propulsive force $F(i_0)$ can be corrected by multiplying the target propulsive force $F(i_0)$ obtained in step S3 by a value $(\alpha'')$ obtained by raising the deceleration coefficient $\alpha$ to the power of n, at intervals of time during which the drive processing is performed, the deceleration coefficient $\alpha$ is multiplied, and the target propulsive force $F(i_0)$ is updated so as to gradually decrease. In this way, the propulsive force output from the omnidirectional wheel 3 located the side away from the turning center can be gradually decreased by a simple method.

Second Embodiment

The cart 1 according to a second embodiment differs from the first embodiment in the correction processing performed by the control device 8 in step S7, and is the same as the first embodiment in the other configurations. Therefore, a description of the other configurations is omitted.

Figure 8:
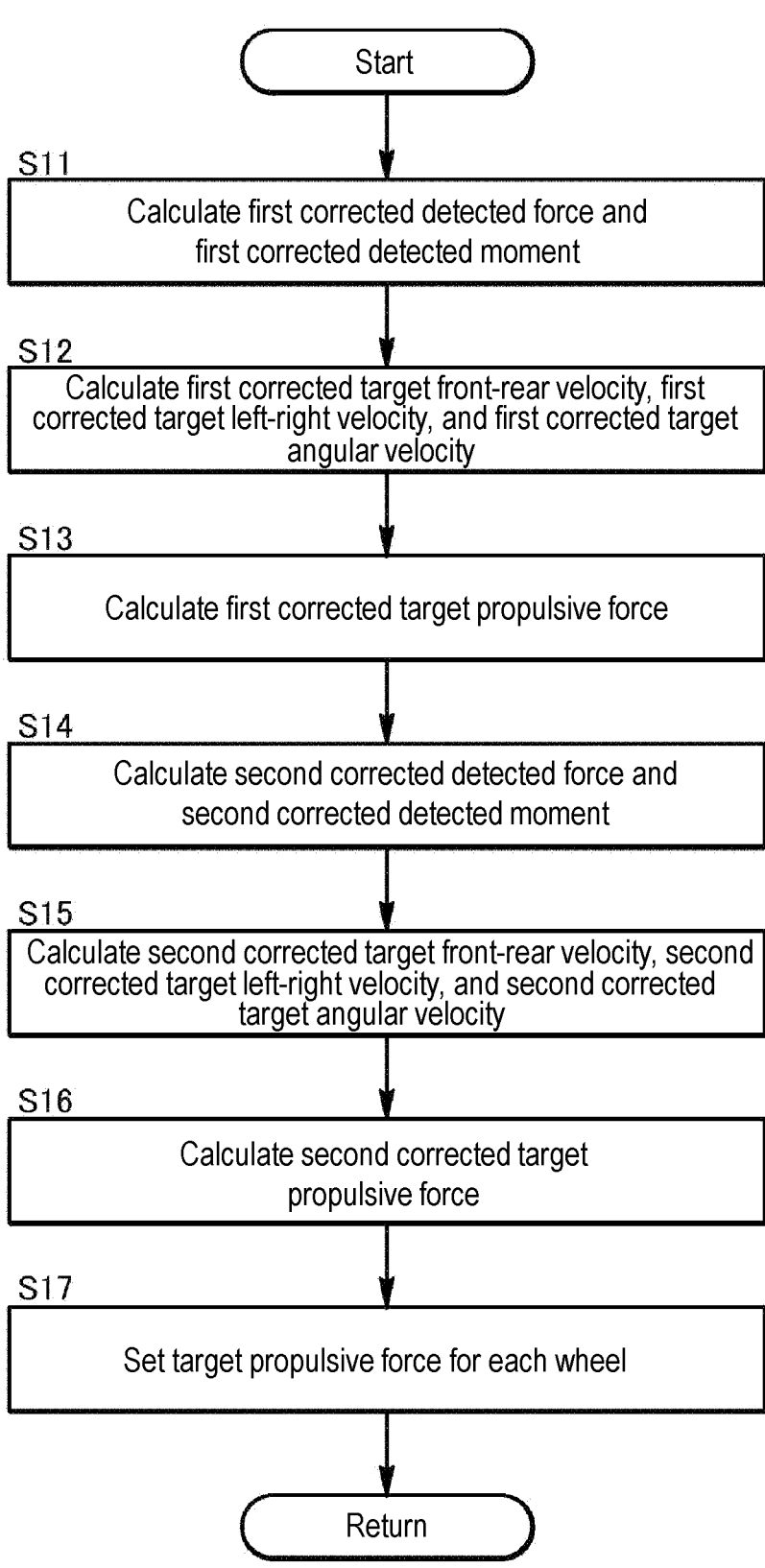
FIG. 8 is a flowchart showing correction processing executed by a control device according to a second embodiment.

The correction processing of the cart 1 according to the second embodiment is described below in detail with reference to a flowchart of FIG. 8.

The control device 8 calculates a first corrected detected force and a first corrected detected moment respectively obtained by multiplying the detected force fs and the detected moment msz acquired in step S1 by a predetermined first parameter B. The first parameter B may be set according to a predetermined constant (hereinafter first deceleration coefficient β) equal to or greater than 0 and less than 1. The first parameter B may be set to a value obtained by raising the first deceleration coefficient β to the power of n, that is, $\beta^n$.

When calculation of the first corrected detected force and the first corrected detected moment is completed, the control device 8 executes step S12. In step S12, similarly to step S2, based on the first corrected detected force and the first corrected detected moment, the control device 8 calculates the target front-rear velocity vt1, the target left-right velocity vt2 and the target angular velocity ωt corresponding to the first corrected detected force and the first corrected detected moment as a first corrected target front-rear velocity, a first corrected target left-right velocity, and a first corrected target angular velocity, respectively.

When calculation of the first corrected target front-rear velocity, the first corrected target left-right velocity and the first corrected target angular velocity is completed, the control device 8 executes step S13. In step S13, similarly to step S3, the control device 8 calculates the target propulsive force F(i) of each omnidirectional wheel 3 corresponding to the first corrected target front-rear velocity, the first corrected target left-right velocity and the first corrected target angular velocity as a first corrected target propulsive force.

When calculation of the first corrected target propulsive force is completed, the control device 8 executes step S14. In step S14, the control device 8 calculates a second corrected detected force and a second corrected detected moment respectively obtained by multiplying the detected force fs and the detected moment msz by a second parameter C different from the first parameter B.

The second parameter C may be set according to a predetermined constant (hereinafter second deceleration coefficient γ) greater than the first parameter B and equal to or greater than 0 and equal to or less than 1. At this time, the second deceleration coefficient γ may be set to a value greater than the first deceleration coefficient β, that is, to satisfy β<γ. The second parameter C may be set to a value obtained by raising the second deceleration coefficient γ to the power of n, that is, $\gamma^n$.

When calculation of the second corrected detected force and the second corrected detected moment is completed, the control device 8 executes step S15. In step S15, similarly to step S2, based on the second corrected detected force and the second corrected detected moment, the control device 8 calculates the target front-rear velocity vt1, the target left-right velocity vt2 and the target angular velocity ωt corresponding to the second corrected detected force and the second corrected detected moment as a second corrected target front-rear velocity, a second corrected target left-right velocity, and a second corrected target angular velocity, respectively.

When calculation of the second corrected target front-rear velocity, the second corrected target left-right velocity and the second corrected target angular velocity is completed, the control device 8 executes step S16. In step S16, similarly to step S3, the control device 8 calculates the target propulsive force F(i) of each omnidirectional wheel 3 corresponding to the second corrected target front-rear velocity, the second corrected target left-right velocity and the second corrected target angular velocity as a second corrected target propulsive force.

When calculation of the second corrected target propulsive force is completed, the control device 8 executes step S17. In step S17, the control device 8 sets the first corrected target propulsive force of the omnidirectional wheel 3 located on the side away from the turning center as a target propulsive force, and sets the second corrected target propulsive force of the omnidirectional wheel 3 located on the side close to the turning center as a target propulsive force. When the setting is completed, the control device 8 ends the correction processing.

Next, effects of the cart 1 configured in this way are described.

Based on the first corrected detected force and the first corrected detected moment obtained by multiplying the load and/or moment acquired by the force sensor 6 by the first parameter B that is less than 1, the control device 8 acquires the first corrected target propulsive force (S11 to S13), and sets the first corrected target propulsive force as the propulsive force of the omnidirectional wheel 3 located on the side away from the turning center (S17).

Accordingly, since the propulsive force of the omnidirectional wheel 3 located on the side away from the turning center during turning is set less than the propulsive force set based on input of the load and/or moment, the cart 1 can be prevented from spinning.

In the present embodiment, based on the second corrected detected force and the second corrected detected moment obtained by multiplying the load and/or moment acquired by the force sensor 6 by the second parameter C that is equal to or less than 1, the control device 8 acquires the second corrected target propulsive force (S14 to S17), and sets the second corrected target propulsive force as the propulsive force of the omnidirectional wheel 3 located on the side close to the turning center (S17).

The first parameter B and the second parameter C are set to mutually different values. In detail, since the first deceleration coefficient β is less than the second deceleration coefficient γ (β<γ), the first parameter B is set to a value less than the second parameter C. The propulsive force (first target propulsive force) based on the first parameter B is set for the omnidirectional wheel 3 located on the side away from the turning center, and the propulsive force (second target propulsive force) based on the second parameter C is set for the omnidirectional wheel 3 located on the side close to the turning center. Accordingly, since the propulsive force of the omnidirectional wheel 3 located on the side away from the turning center is set relatively low, the cart 1 can be effectively prevented from spinning.

Third Embodiment

The cart 1 according to a third embodiment differs from the cart 1 according to the first embodiment in the configuration of the correction processing, and is the same as the first embodiment in the other configurations. Therefore, a description of the other configurations is omitted.

Figure 9:
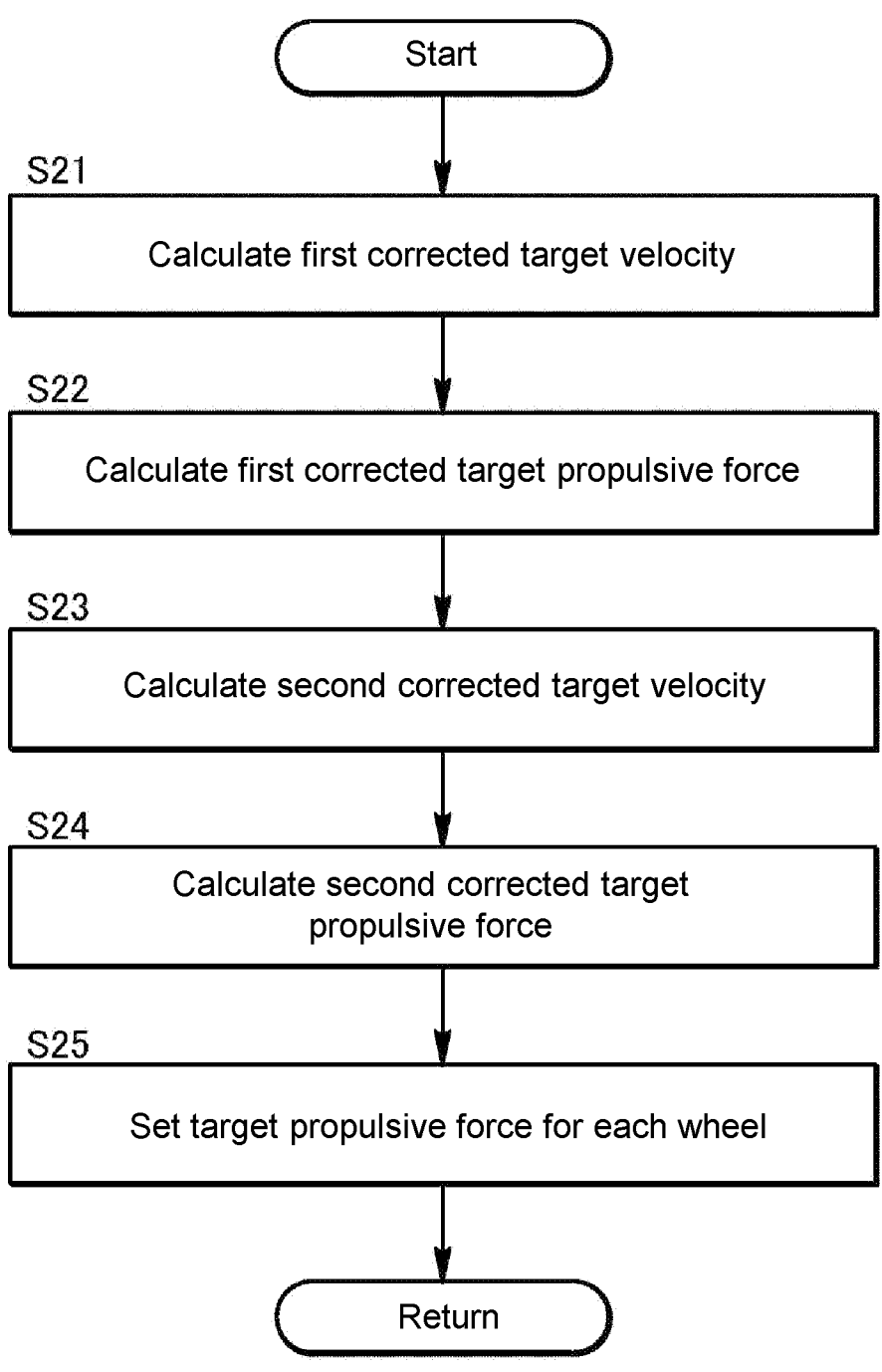
FIG. 9 is a flowchart showing correction processing executed by a control device according to a third embodiment.

The correction processing of the cart 1 according to the third embodiment is described below in detail with reference to a flowchart of FIG. 9.

In the first step S21 of the correction processing, by multiplying the target front-rear velocity and the target left-right velocity acquired in step S2 by the same first parameter B as in the second embodiment, the control device 8 calculates the first corrected target front-rear velocity and the first corrected target left-right velocity. Hereinafter, a velocity vector composed of the first corrected target front-rear velocity and the first corrected left-right velocity is referred to as first corrected target velocity. That is, in step S21, the control device 8 calculates the first corrected target velocity by multiplying a target velocity by the first parameter B. When calculation of the first corrected target velocity is completed, the control device 8 executes step S22.

However, similarly to the second embodiment, the first parameter B may be set according to the first deceleration coefficient β that is a constant equal to or greater than 0 and less than 1. The first parameter B may be set to a value obtained by raising the first deceleration coefficient β that is a constant equal to or greater than 0 and less than 1 to the power of n, that is, $\beta^n$.

In step S22, similarly to step S3, based on the first corrected target velocity and the target angular velocity, the control device 8 calculates the target propulsive force F(i) of each omnidirectional wheel 3 corresponding to the first corrected target velocity and the target angular velocity as the first corrected target propulsive force. When calculation of the first corrected target propulsive force is completed, the control device 8 executes step S23.

In step S23, by multiplying the target front-rear velocity and the target left-right velocity acquired in step S2 by the same second parameter C as in the second embodiment, the control device 8 calculates the second corrected target front-rear velocity and the second corrected target left-right velocity. Hereinafter, a velocity vector composed of the second corrected target front-rear velocity and the second corrected left-right velocity is referred to as second corrected target velocity. That is, in step S23, the control device 8 calculates the second corrected target velocity by multiplying a target velocity by the second parameter C. When calculation of the second corrected target velocity is completed, the control device 8 executes step S24.

However, similarly to the second embodiment, the second parameter C may be set according to the second deceleration coefficient γ that is a constant equal to or greater than 0 and equal to or less than 1. The second parameter C may be set to a value obtained by raising the second deceleration coefficient γ that is a constant equal to or greater than 0 and equal to or less than 1 to the power of n, that is, $\gamma^n$. The first deceleration coefficient β may be set less than the second deceleration coefficient γ, and the first parameter B may be set less than the second parameter C. Accordingly, the first corrected target velocity is set less than the second corrected target velocity.

In step S24, similarly to step S3, based on the second corrected target velocity and the target angular velocity, the control device 8 calculates the target propulsive force F(i) of each omnidirectional wheel 3 corresponding to the second corrected target velocity and the target angular velocity as the second corrected target propulsive force. When calculation of the second corrected target propulsive force is completed, the control device 8 executes step S25.

In step S25, the control device 8 sets the first corrected target propulsive force of the omnidirectional wheel 3 located on the side away from the turning center as the target propulsive force of the omnidirectional wheel 3 located on the side away from the turning center, and sets the second corrected target propulsive force of the omnidirectional wheel 3 located on the side close to the turning center as the target propulsive force of the omnidirectional wheel 3 located on the side close to the turning center. When the setting is completed, the control device 8 ends the correction processing.

Next, effects of the cart 1 configured in this way are described.

If the number of rotations of the omnidirectional wheel 3 located on the side close to the turning center has exceeded the rotation number threshold during turning (Yes in S4), the control device 8 calculates the first corrected target velocity corrected to be less than the target velocity set based on the load and/or moment (S21), and corrects the target propulsive force of the omnidirectional wheel 3 located on the side away from the turning center based on the first corrected target velocity (S25). Accordingly, the target propulsive force of the omnidirectional wheel 3 located on the side away from the turning center is set less than the target propulsive force set based on the load and/or moment. Hence, since the cart 1 is decelerated, the cart 1 can be prevented from spinning, and the cart 1 can be provided that is able to perform a proper turning motion. In this way, an object to be corrected is not necessarily a target propulsive force, and may be a target velocity for acquiring a target propulsive force.

Meanwhile, the control device 8 calculates the second corrected target velocity corrected to be less than the target velocity set based on the load and/or moment (S23), and corrects the target propulsive force of the omnidirectional wheel 3 located on the side close to the turning center based on the second corrected target velocity (S25). Since the first corrected target velocity is less than the second corrected target velocity, the propulsive force of the omnidirectional wheel 3 located on the side away from the turning center is suppressed than the propulsive force of the omnidirectional wheel 3 located on the side close to the turning center due to correction. Accordingly, the cart 1 is decelerated and has an increased turning radius, and the cart 1 can be prevented from spinning.

Modifications

In the above embodiments, the omnidirectional wheels 3 are arranged side by side in the left-right direction on the body 2. However, the disclosure is not limited to this aspect. The omnidirectional wheels 3 may be arranged side by side in the front-rear direction on the body 2. However, when the omnidirectional wheels 3 are arranged side by side in the front-rear direction on the body 2, the rotation number threshold is set to a larger value than that of the case where the omnidirectional wheels 3 are arranged side by side in the left-right direction on the body 2.

When the omnidirectional wheels 3 are lined up parallel to the turning direction, changing the turning radius by changing the propulsive force of the omnidirectional wheels 3 is not easy as compared to the case where the omnidirectional wheels 3 are lined up in a direction orthogonal to the turning direction. Hence, in a modification, a threshold when the omnidirectional wheels 3 are lined up parallel to the turning direction and it is not easy to change the turning radius is set less than that of the case where the omnidirectional wheels 3 are lined up in a direction orthogonal to the turning direction. Thus, when it is difficult to change the turning radius, since a change of the propulsive force is promptly made, the cart 1 can be effectively prevented from spinning.

In the third embodiment mentioned above, in the case of determining the control amount of each electric motor 25 of the drive unit 4 based on the target velocity (target front-rear velocity vt1 and target left-right velocity vt2) and the target angular velocity ωt, the control device 8 may be configured to omit steps S2, S22 and S24 (that is, to omit calculation of the target propulsive force) and perform steps S21 and S23 so as to correct the target velocity. In this case, the control device 8 may set the target velocity and the target angular velocity for each of the left and right omnidirectional wheels 3 in step S2. In step S25, the control device 8 may correct the target velocity of the omnidirectional wheel 3 located on the side away from the turning center to the first corrected target velocity, and correct the target velocity of the omni-directional wheel 3 located on the side close to the turning center to the second corrected target velocity. After that, in step S8, the control device 8 may set the number of rotations of each omnidirectional wheel 3 based on the target velocity and the target angular velocity set for each omnidirectional wheel 3.

Accordingly, in the case where the number of rotations of the omnidirectional wheel 3 located on the side close to the turning center exceeds a predetermined threshold during turning, the control device 8 acquires a drive amount (num-ber of rotations) of the omnidirectional wheel 3 located on the side away from the turning center based on the first corrected target velocity that is less than the target velocity set based on the load and/or moment, and the target angular velocity. The control device 8 acquires a drive amount (number of rotations) of the omnidirectional wheel 3 located on the side close to the turning center based on the second corrected target velocity that is less than the target velocity set based on the load and/or moment, and the target angular velocity. Accordingly, compared to the case where the drive amount is calculated based on the target velocity, the cart 1 is decelerated and has an increased turning radius, and the cart 1 can be prevented from spinning.

In the second and third embodiments mentioned above, the first parameter B is configured to be less than the second parameter C. In the disclosure, it suffices if at least the first parameter B is less than 1, and the second parameter C is set equal to or less than 1, and it suffices if the target propulsive force set for the omnidirectional wheel 3 located on the side away from the turning center and the target velocity corre-sponding to the omnidirectional wheel 3 are set less than the target propulsive force and the target velocity set based on the load and/or the moment.

For example, the first parameter B and the second param-eter C may each be a predetermined value less than 1. Alternatively, the first parameter B and the second parameter C may be set equal to each other and less than 1. Accord-ingly, when a spin is likely to occur, since the number of rotations of each omnidirectional wheel 3 is decreased and the cart 1 decelerates, the cart 1 can be prevented from spinning.

Although specific embodiments have been described above, the disclosure is not limited to the above embodi-ments and may be widely modified.

In another embodiment, instead of the force sensor 6, a sensor that is able to detect a front-rear load, a left-right load, and moment about a vertical axis applied to the handle 5 may be used. For example, the sensor may be configured by combining a plurality of independent load sensors.

In the above embodiments, the omnidirectional wheel 3 is provided in the cart 1. However, the disclosure is not limited to this aspect. In the cart 1, instead of the omnidirectional wheel 3, a pair of left and right wheels may be provided that can be driven based on the target front-rear velocity and the target angular velocity.

In the above embodiments, in the case where the number of rotations of the omnidirectional wheel 3 located on the side close to the turning center exceeds the rotation number threshold, the control device 8 is configured to compensate for the target propulsive force considering that the cart 1 may slip (spin). However, a method for detecting a slip of the cart 1 by the control device 8 is not limited to the method of the above embodiments. For example, if the cart 1 is provided with the omnidirectional wheels 3 arranged side by side in the left-right direction and a velocity sensor that detects a velocity of each omnidirectional wheel 3 in the left-right direction, the control device 8 may, based on a detection result by the velocity sensor, calculate a difference in the velocity in the left-right direction between the left and right omnidirectional wheels 3, and may determine that a slip of the cart 1 may occur when (an absolute value of) the calculated difference in the velocity in the left-right direction becomes equal to or greater than a predetermined threshold.

What is claimed is:

1. A cart, comprising:
a body;
a plurality of wheels, provided on the body;
a drive unit, driving each of the plurality of wheels;
a handle, provided on the body and receiving a user's operation;
an input detection sensor, detecting a load and/or a moment applied to the handle;
a rotation number sensor, detecting a number of rotations of each of the plurality of wheels; and
a control device, setting a target propulsive force to be output as a propulsive force from each of the plurality of wheels based on the load and/or the moment, and controlling the drive unit to output the target propulsive force as the propulsive force, wherein
in response to the number of rotations of the wheel located on a side close to a turning center exceeding a prede-termined threshold during turning, the control device sets at least the target propulsive force of the wheel located on a side away from the turning center to be less than the target propulsive force set based on the load and/or the moment.

2. The cart according to claim 1, wherein
the control device sets the target propulsive force of the wheel located on the side away from the turning center to gradually decrease with time.

3. The cart according to claim 2, wherein
the control device updates the target propulsive force of the wheel located on the side away from the turning center by multiplication by a predetermined numerical value less than 1 at intervals of a predetermined time, and causes the target propulsive force to gradually decrease with time.

4. The cart according to claim 3, wherein
the predetermined threshold differs between when the plurality of wheels are lined up in a direction orthogo-nal to a turning direction with respect to the body and when the plurality of wheels are lined up parallel to the turning direction with respect to the body.

5. The cart according to claim 2, wherein
the predetermined threshold differs between when the plurality of wheels are lined up in a direction orthogo-nal to a turning direction with respect to the body and when the plurality of wheels are lined up parallel to the turning direction with respect to the body.

6. The cart according to claim 1, wherein
the predetermined threshold differs between when the plurality of wheels are lined up in a direction orthogo-nal to a turning direction with respect to the body and when the plurality of wheels are lined up parallel to the turning direction with respect to the body.

7. The cart according to claim 4, wherein
the predetermined threshold when the plurality of wheels are lined up in the direction orthogonal to the turning direction with respect to the body is greater than the predetermined threshold when the plurality of wheels are lined up parallel to the turning direction with respect to the body.

8. The cart according to claim 1, wherein
the control device sets the target propulsive force of the wheel located on the side away from the turning center based on the load and/or the moment obtained by multiplying the load and/or the moment acquired by the input detection sensor by a predetermined first parameter less than 1.

9. The cart according to claim 8, wherein
the control device sets the target propulsive force of the wheel located on the side close to the turning center based on the load and/or the moment obtained by multiplying the load and/or the moment acquired by the input detection sensor by a predetermined second parameter less than 1; and
the first parameter and the second parameter are set to different values.

10. The cart according to claim 9, wherein
the first parameter is less than the second parameter.

11. The cart according to claim 1, wherein
each of the plurality of wheels is an omnidirectional wheel that is able to be driven in each of a front-rear direction and a left-right direction; and
the control device controls the drive unit to output the target propulsive force as the propulsive force in the front-rear direction, and sets the propulsive force in the left-right direction of the wheel located on the side close to the turning center in a same direction as a centrifugal force.

12. The cart according to claim 1, wherein
the control device acquires a target velocity and a target angular velocity of the cart based on the load and/or the moment, sets the target propulsive force corresponding to the target velocity and the target angular velocity, and controls the drive unit to output the target propulsive force as the propulsive force; and
in response to the number of rotations of the wheel located on the side close to the turning center exceeding the predetermined threshold during turning, the control device sets the target velocity to be less than the target velocity set based on the load and/or the moment.

13. A cart, comprising:
a body;
a plurality of wheels, provided on the body;
a drive unit, driving each of the plurality of wheels;
a handle, provided on the body and receiving a user's operation;
an input detection sensor, detecting a load and/or a moment applied to the handle;
a rotation number sensor, detecting a number of rotations of each of the plurality of wheels; and
a control device, setting a target velocity and a target angular velocity of the cart based on the load and/or the moment, acquires a drive amount of each of the plurality of wheels and controls the drive unit to cause the cart to travel at the target velocity and the target angular velocity, wherein
in response to the number of rotations of the wheel located on a side close to a turning center exceeding a predetermined threshold during turning, the control device acquires at least the drive amount of the wheel located on a side away from the turning center based on a corrected target velocity less than the target velocity set based on the load and/or the moment and the target angular velocity.

\* \* \* \* \*